United States Patent
Grabelsky et al.

(10) Patent No.: US 6,678,250 B1
(45) Date of Patent: Jan. 13, 2004

(54) METHOD AND SYSTEM FOR MONITORING AND MANAGEMENT OF THE PERFORMANCE OF REAL-TIME NETWORKS

(75) Inventors: David A. Grabelsky, Skokie, IL (US); Ikhlaq S. Sidhu, Vernon Hills, IL (US); Guido M. Schuster, Des Plaines, IL (US); Jacek A. Grabiec, Chicago, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/252,840

(22) Filed: Feb. 19, 1999

(51) Int. Cl.[7] .............................. H04J 3/14; H04L 12/26
(52) U.S. Cl. ........................ 370/241; 370/401; 709/224
(58) Field of Search .................................. 370/401, 252, 370/241, 242, 244, 245, 250; 709/224; 714/47; 379/112.01, 32.01

(56) References Cited

U.S. PATENT DOCUMENTS

| | | | | |
|---|---|---|---|---|
| 5,218,602 A | * | 6/1993 | Grant et al. ................. | 370/401 |
| 5,812,529 A | * | 9/1998 | Czarnik et al. .............. | 370/401 |
| 5,886,643 A | * | 3/1999 | Diebboll et al. ............ | 370/401 |
| 6,081,591 A | * | 6/2000 | Skoog ........................ | 709/224 |
| 6,421,720 B2 | * | 7/2002 | Fitzgerald ................... | 370/252 |
| 6,466,548 B1 | * | 10/2002 | Fitzgerald ................... | 370/401 |

OTHER PUBLICATIONS

"RTP: A Transport Protocol for Real-Time Applications", RFC 1889, Schulzrinne et al., Jan. 1996.*

* cited by examiner

Primary Examiner—Chau Nguyen
Assistant Examiner—Soon-Dong Hyun
(74) Attorney, Agent, or Firm—McDonnell Boehnen Hulbert & Berghoff

(57) ABSTRACT

Gateway routers for real-time networks have the ability to collect delay, loss, and jitter statistics on a per-connection basis. It is possible to use this information not only to monitor the quality of individual voice calls and other real-time connections, but also to evaluate the overall performance of the underlying network. This paper describes a method for monitoring and managing the performance of a real-time data network that supports voice, video and other real-time services. In the described embodiments, the RTCP mechanisms of RTP for sender and receiver reporting be used to relay performance information to one or more network monitoring sites for analysis and interpretation. In addition, gateway routers are organized and managed within a hierarchy that allows the monitoring function to localize it view of network conditions within the hierarchy; and the monitoring of network performance can occur on various time scales.

5 Claims, 6 Drawing Sheets

METHOD AND SYSTEM FOR MONITORING AND MANAGEMENT OF THE PERFORMANCE OF REAL-TIME NETWORKS

FIELD OF INVENTION

This invention relates in general to the monitoring and analysis of communication networks and more particularly, it is directed to providing a system capable of monitoring the quality of individual voice, video and other real-time connections, and also monitor and evaluate the overall performance of packet-based networks.

BACKGROUND OF THE INVENTION

The Internet is a worldwide network of interconnected computers allowing users to transmit, access and obtain files from other computers and users on the network. In recent years, the Internet is becoming used more and more for new real-time applications such as allowing telephone callers to place voice telephone calls over the Internet. In addition, other real-time interactive applications such as videoconferencing allow users to conduct meetings over the network without having to physically travel to the meeting location or incur long distance communication charges.

The performance of these network applications, however, has generally disappointed users due to the vagaries of the performance and reliability of interactive communication applications over packet-based networks such as the Internet. The Internet was not originally designed for interactive communication, but rather, for the bulk transport of packets of digital data using non-interactive protocols, such as sending electronic mail ("E-mail"), File Transfer Protocol ("FTP"), and network news, i.e., USENET. Regardless, a number of real-time protocols have been designed and marketed, including RealAudio by RealNetworks, NetMeeting by Microsoft, and many others.

The performance of the network implementing these applications, however, is difficult for network operators to monitor and determine. The performance of interactive network application software operating over the Internet or other packet-based networks depends on the ability of the network to deliver digital packets of audio and video information between callers. Internet packet delivery delay and loss dynamics, however, can be extremely variable. Packet delay and loss characteristics between two callers or hosts devices may remain stationary for an hour or more, or they may change dramatically second-by-second. Different pairs of host devices communicating over the same network may also experience different network performance dynamics due to available network bandwidth and background traffic patterns. This temporal and spatial heterogeneity of the network performance makes it difficult to monitor the performance of the network. Without visibility of network performance, operators have difficulty identifying and addressing trouble areas to improve performance.

Today, network edge devices such as gateway devices that deliver packets between host devices can generate statistics on the packet delivery performance of particular call connections, also referred to as sessions. On a per-connection basis, network performance statistics such as the delay in delivering packets, packets loss, and jitter are routinely generated. On an individual connection between a pair of host devices, this network performance data can provide a snapshot of the packet delivery performance between a pair of host devices. Although this per-connection network performance data is available for an ongoing session or connection, a need exists for utilizing network packet delivery performance information for detecting network trouble areas or to provide an overall view of network performance.

SUMMARY OF THE INVENTION

In accordance with an illustrative embodiment of the present invention, problems associated with the monitoring and analyzing of real-time network performance are addressed. According to an aspect of the illustrative embodiment, a network edge device such as a gateway router, is capable of collecting network connection statistics to determine the packet delivery performance of individual network connections, as well as the overall quality of network performance.

The present embodiment provides a network performance monitoring and management system based upon the per-connection statistics collected by the individual network devices or gateways. On a global scale across the network, the network performance statistics collected from network connections across the network can be used to monitor the overall performance of the underlying network to provide a picture of "average" network conditions, as well as highlighting trouble spots.

In an illustrative embodiment of the invention describing a Voice-over-IP (VoIP) network, the voice gateways transmit audio, video and other data in RTP (Real-time Transport Protocol) streams. RTP includes a control protocol, RTCP (RTP Control Protocol), which allows session members participating in a session to exchange information related to network performance. RTCP collects statistics on the quality of the transport service between session members; i.e., remote applications communicating over the network and transmits the statistical data between the session members. The illustrative embodiment presented here utilizes RTCP to generate and transmit the relevant network performance statistics. The network performance is organized and maintained in databases and monitored to analyze the data to provide information regarding network performance.

According to another aspect of the invention, the network is organized according to a hierarchical grouping of gateway devices to facilitate monitoring of the network. Gateway devices forming the network are hierarchically grouped in clusters. For example, gateways in the zero hierarchy level are grouped into clusters whereby each gateway in a cluster exchanges data with any other gateway in that cluster. Each level zero cluster also includes a cluster network monitor that monitors network performance conditions between gateway pairs within its cluster. The cluster monitor may also maintain a database to maintain network performance data of the gateway pairs within its cluster.

The next hierarchy level of gateways, level one, includes a specific set of level zero hierarchy clusters. Level one cluster pairs are defined as any pairs of gateways belonging to different level zero clusters within the level one cluster. That is, each gateway in a level one cluster pair belongs to a different level zero cluster, but each gateway's parent level zero cluster is a member of the level one cluster. The level one cluster also has a network monitor for all level one cluster pairs within the level one cluster, a level one cluster monitor. Theoretically, the hierarchy can extend in this fashion up to n levels for any positive integer n.

The hierarchical network organization has several advantages. First, traffic associated with the network performance monitoring and management function can be distributed and the processing burden can also be placed on the appropriate network monitor. Further, the hierarchical arrangement allows for topological localization of the network conditions being monitored. In particular, problems can be traced to the smallest relevant level of the network hierarchy, helping to isolate trouble spots. For system-wide monitoring, the local conditions, e.g. at the level zero cluster level must be made available at the global level. Thus, information can be passed up according to the network hierarchy so that the system can be monitored at a high level.

According to another aspect of the invention, the monitoring system provides for monitoring the network conditions at different frequencies or time scales. In the illustrative embodiment, the network is monitored according to three time scales: real-time, near real-time, and daily time scales. Real-time monitoring is particularly useful for alarms, near real-time monitoring for current network traffic conditions, and daily monitoring for long-term network trend analysis.

According to still another aspect of the invention, network performance data are collected and maintained in databases for organizing network performance data. Preferably, a database maintains the network performance data according to source-destination gateway pairs. The combination of the source gateway and the particular gateway on which the database is maintained defines the source-destination gateway pair and thus the cluster monitor for monitoring the clusters that the gateway pair falls within. The gateway database is periodically updated by adding newly acquired performance statistics to any previously acquired statistics for the network pair. Preferably, databases of network performance information can be transferred to the highest level network monitor according to the described network hierarchy for system-wide monitoring of overall network performance.

The present embodiment allows for the monitoring and management of network performance. Network performance statistics from individual connections between gateway devices can be collected, maintained and analyze to obtain overall network performance, as well as providing different views of network performance. Trouble spots can be identified, isolated and examined. The network hierarchy allows the organization and management network performance information across a large scalable network.

The foregoing and other features and advantages of an illustrative embodiment of the present invention will be more readily apparent from the following detailed description, which proceeds with references to the accompanying drawings.

DETAILED DESCRIPTION OF AN ILLUSTRATIVE EMBODIMENT

Exemplary Packet Network

Figure 1:
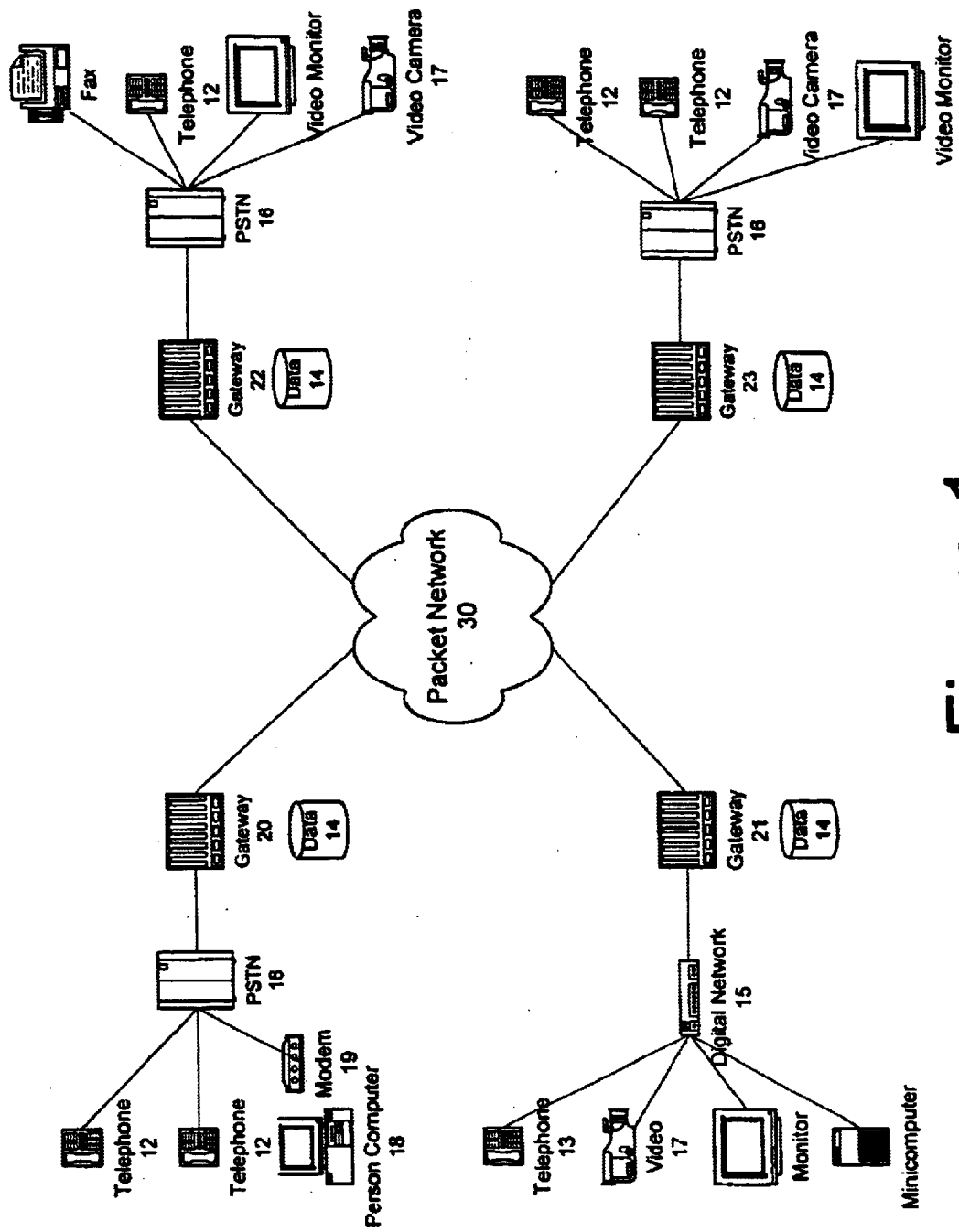
FIG. 1 shows a simplified high-level diagram illustrating a packet-based network system embodying an aspect of the present invention.

FIG. 1 shows a simplified block diagram illustrating the high-level architecture of an exemplary packet-based network 30 ("PBN"). Analog phone calls are initiated at analog telephones 12 that establish call connections to access the network 30 through the Public Switched Network ("PSTN") 16. The PSTN call connections are terminated at modems (not shown) provided by edge devices 20, 21, 22, and 23 to interface the network 30. Preferably, the network 30 is an Internet Protocol ("IP") based digital network. This illustrative embodiment refers to an exemplary IP-based network for purposes of simplicity and clarity of explanation. Of course, the network 30 can be any of a variety of packet-based networks and interconnected digital networks including private networks, the Internet, intranets and other digital communication networks. It should also be understood that the analog telephones 12 need not be connected through the PSTN 16 to access the network 30. In addition, digital telephones 13 that connect directly to a digital network 15 such as a local area network or intranet that are capable of connecting to a PBN may also be used.

The illustrative embodiment of the network performance monitoring system is directed to a Voice-over Internet Protocol ("VoIP") application. In the context of a VoIP application, the network devices providing voice access to the network may commonly be referred to as voice gateways. In a VoIP system, the real-time voice data are transported as digital data packets. It should be understood that in other applications, the devices accessing the network 30 need not be analog telephones 12 but may be other communication and computing devices such as video cameras 17, personal computers 18, modems 19, etc.

Generally, at the first voice gateway 20, incoming analog (voice) signals for each telephone call initiated from an analog telephone 12 are sampled, coded, and packetized by a dedicated modem within the gateway 20 to be transported as digital packets over the IP network 30. The coded voice data are packetized using RTP ("Real-Time Transport Protocol") as more fully described below. RTP is a transport protocol particularly suited for carrying real-time data such as audio, video and simulation or other interactive data.

Exemplary Transport Protocol—RTP

RTP is primarily designed to provide end-to-end network transport functions suitable for real-time network applications such as a VoIP application transmitting real-time audio data over the network. RTP is more fully defined by the Internet Engineering Task Force "RTP: A Transport Protocol for Real-Time Applications" Nov. 18, 1998, ietf-avt-rtp-new-02.txt, Schulzrinne et al. ("RTP paper"), which is fully incorporated herein by reference. RTP is designed to optimize the end-system processing speed for the real-time data such as interactive voice and video data. The RTP packets are themselves transported within another protocol such as UDP (User Datagram Protocol) packets on the IP network. UDP provides multiplexing and checksum services, however, RTP may be used with a variety of different underlying network or transport protocols as known to those of skill in the art and those yet to be promulgated. A router function in the gateway 20 directs the RTP packets onto the IP network 30 that transports the packet to the destination voice gateway 23.

At the destination gateway device 23, the RTP packets are routed from the IP network 30 to a modem according to an appropriate mechanism to idenitify the phone call. The voice data in each RTP packet is decoded and played out, recreating the original analog signal with some associated fidelity, and transmitted to the receiving telephone 12. For simple two-way telephone voice calls, this process is obviously symmetric for routing packets back and forth between callers. Omitted from this figure are the architectural network support components that perform signaling, network admission control, etc.

RTP is particularly designed to satisfy the needs of multi-participant multimedia conferences, such as multiple party video conference calls that involve many streams of audio and video transmitted to multiple callers. For example, to provide a videoconference connection with multiple callers simultaneously communicating with one another requires multiple sessions sending media streams between all the call participants. RTP is capable of supporting data transfer to multiple destinations using multicast distribution provided by the underlying network and transport protocols. A stream of such RTP packets that are associated with a given telephone or videoconference connection is said to belong to an RTP session. The RTP session identifies the call, and session members all participate in the call to receive call information. If both audio and video media are used in a connection, the audio and video streams are transmitted as separate RTP sessions. Multi-party conference calls may thus require multiple RTP sessions, with multiple participants per session.

Although RTP sessions also have broader applicability beyond simple two-way telephone voice call connections, for the purposes of clarity this present embodiment is described with respect to a RTP session limited to a simple two-way telephone voice call. For a given session, each call connection participant is classified within the RTP protocol as either a sender or receiver, based upon how recently it has transmitted an RTP packet.

Exemplary Transport Control Protocol—RTCP

In addition to real-time data transmission, RTP includes a control protocol, RTCP (RTP Control Protocol), which allows session members of an on-going session to monitor and exchange information related to the network performance, as well as, providing minimal control signaling functions. RTCP is also more fully described in the RTP paper. A large part of RTCP is aimed at generating statistics on the quality of the packet transport service between session members; i.e., remote applications communicating via RTP streams. RTCP is particularly directed for generating and collecting packet delivery performance specifications on an individual, per-connection basis. RTCP, however, provides only individual connection statistics and does not provide a picture of overall network performance. The embodiment presented here utilizes RTCP to generate the relevant per-connection performance statistics and defines how they are collected and maintained in databases 14 (FIG. 1) to build a network management system capable of providing network performance information. Preferably, each gateway 20 includes a database 14 to collect and maintain network performance information generated by RTCP or other similar protocols or processes.

Similar to RTP, RTCP also supports real-time voice and video conferencing for large groups of users over the Internet including source identification and support for audio and video bridges/gateways. Again, for clarity of illustration, only a VoIP network application using RTCP is considered here. However, the teachings herein may be applied to any real-time network; i.e., one that carries video, supports conference calling, multicasting, etc.

RTCP data are carried in RTCP packets that are distinct from RTP packets, but in this embodiment are transported on the same lower-layer protocol, in this example UDP for an IP network. That is, RTCP packets associated with an RTP session are transmitted "in-band" with the RTP traffic. Thus, the bandwidth of each RTP session includes some proportion of RTCP packet traffic.

Of particular relevance to the present embodiment of a network management system are RTCP packets sent by RTP session members to other session members commonly referred to as sender reports ("SRs"), and messages sent by receivers, receiver reports ("RRs"). SR and RR messages carry information that characterize packet delivery conditions on the network carrying the RTP traffic. Depending upon whether a session member is a sender or a receiver, it periodically transmits and SR or RR messages to all other session members (only one, in a simple two-way VoIP telephone call). Thus, each session member periodically receives a SRs or RRs from each other session member(s).

RTP Sessions

Figure 2:
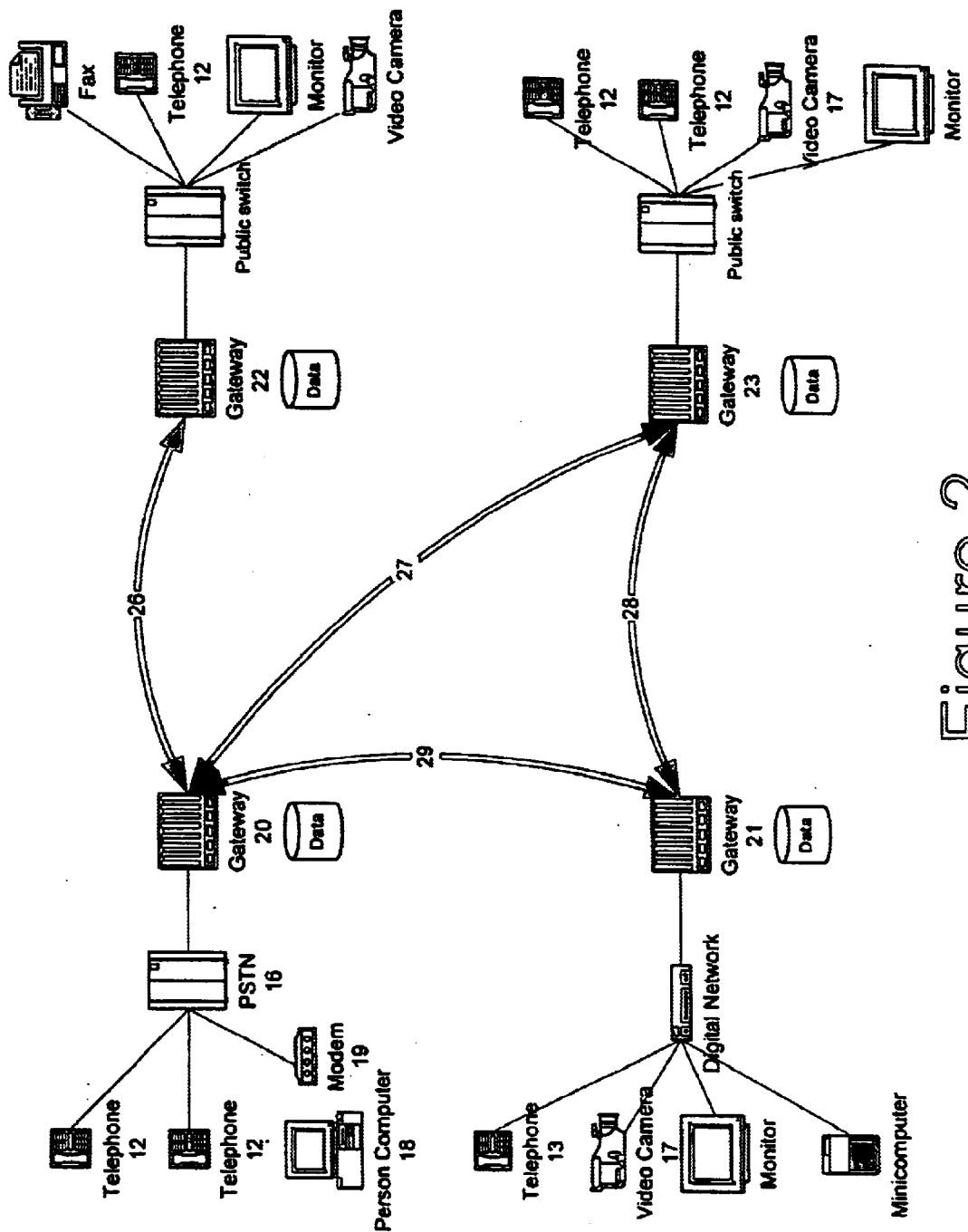
FIG. 2 shows a simplified high-level diagram illustrating the RTP sessions and streams according to the illustrative network of FIG. 1.
Figure 3:
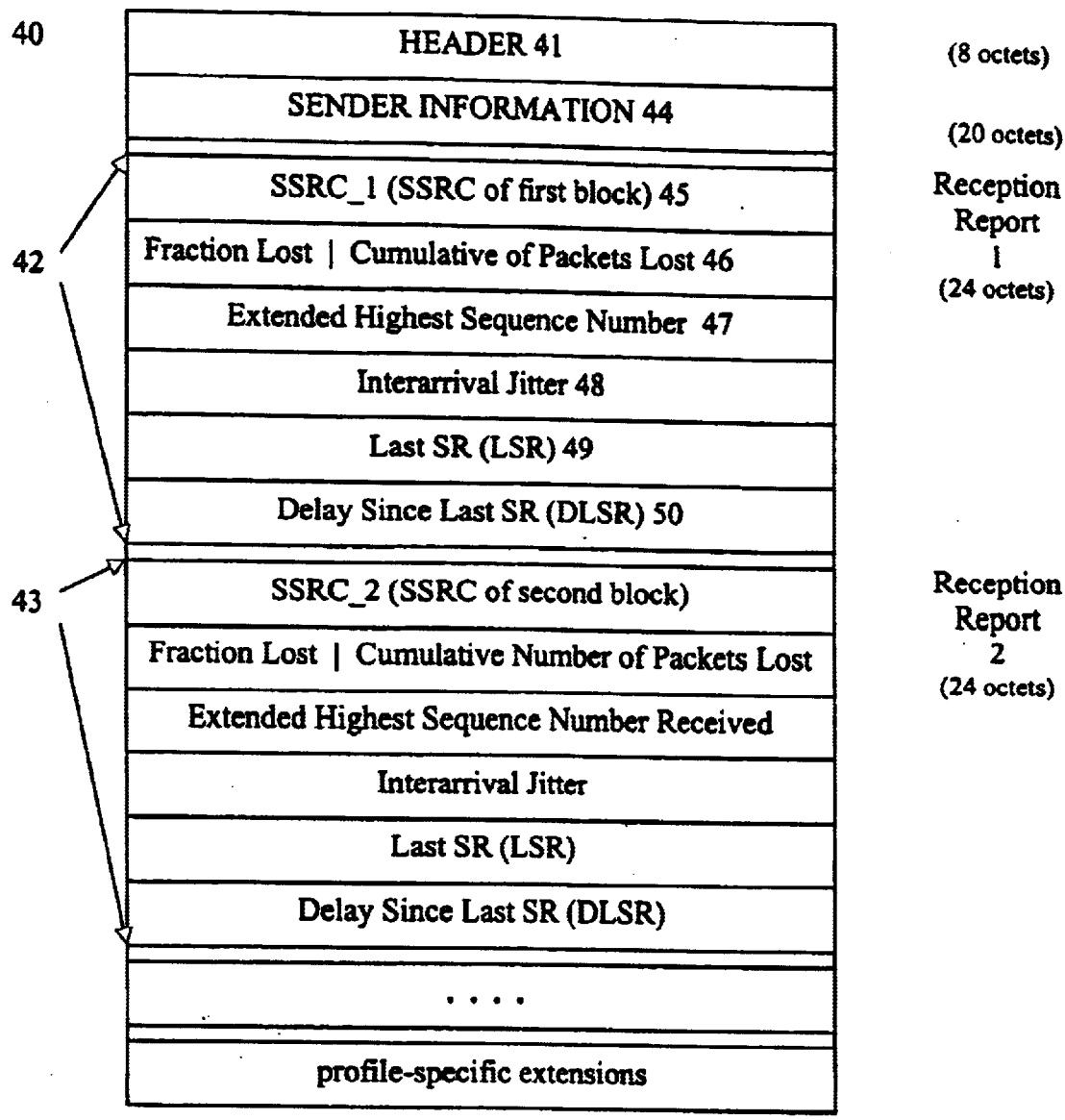
FIG. 3 shows a diagram of an RTCP packet used in this embodiment.

FIG. 2 shows the relation between the high-level picture shown in FIG. 1 and RTP sessions and voice/video packet streams traversing the network. Each of the lines 26, 27, 28, 29 between two gateways 20, 21, 22, 23 represents a bi-directional RTP session terminated between the gateways. As illustrated in FIG. 3, one gateway 20 may simultaneously terminate sessions with several other gateways 21, 22, 23. It is expected that the network conditions will, on average, be the same for all sessions 26, 27, 28, 29 between a given pair of gateways. This suggests that copies of the reception report blocks from all SR and RR messages created at a given gateway 20 for transmission are preferably maintained at that gateway 20. Further, these reception report blocks should be partitioned according to source gateways to which they apply, and be processed as a statistical ensemble to provide a characterization of the network conditions between that source-destination gateway pair, such as gateway pair 20, 23. A further description of SR and RR packets and the reception report block contained therein are described in more detail below. Two alternative approaches to the retention of reception report blocks by the generating gateway are also further discussed herein.

Exemplary RTCP Packet Format

Referring now to FIG. 3, an embodiment of the RTCP packet 40 such as a SR packet includes a fixed header 41, similar to a standard RTP data packet, followed by a number of elements that may vary according the RTCP packet type. Multiple RTCP reception report blocks 42, 43 can be sent together as part of a compound RTCP 40 within a single packet of the underlying protocol as enabled by a field length field (not shown) within the header 41 of the RTCP packet. The field length allows a receiver to determine the length of the packet. As seen in the embodiment of FIG. 2, the RTCP packet header 41 itself is 8 octets in length.

An SR message also includes a sender information block 44 describing statistical properties of packet transmission delivery performance as reported by the creator of the SR packet. Typically, transmission information such as timestamps indicating the time when the reception report was sent, and packet and octet information is carried by the sender report. As seen in the embodiment of FIG. 3, 20 octets are allocated for the sender information 44.

Each SR and RR also includes a reception report block 42 corresponding to every session member from which the creator of the SR or RR is receiving RTP packets. For a simple two-way voice call, each session member receives a reception block 42 from only one source; i.e., the session member at the other end of the call. The reception report block 42 carries data that describes statistical properties of the RTP packets it is receiving as observed by the creator of the SR or RR.

As seen in the embodiment of FIG. 3, a reception report block 42 includes a number data of fields containing network data including network packet delivery performance data pertaining to the call session. For example a reception report 42 preferably provides network performance statistics regarding the reception of RTP data packets received from the source gateway that the reception report 42 block corresponds to. The first field 45 of the reception report block 42 indicates the source gateway that the data in the reception report block 42 pertains to, in this example SSRC_1. Because one of the gateways in the gateway session pair will be the source of the transmission, its IP address is already contained in the IP header of the transmission. Thus, only one additional 32-bit value is required to include the IP address of the gateway at the other end of the session.

Preferably, the following field 46 of the reception report includes a packet loss information field providing 8-bits for the fractional packet loss and 24 bits for the cumulative number of packets lost during the session. The fractional packet loss indicates the fraction of packets lost since the previous SR or RR message was sent. The fractional packet loss is indicated by the number of packets lost divided by the number of packets expected. The cumulative number of packets lost includes the number of packets expected minus the number of packets received.

The following field 47 of the reception report includes 32 bits for the extended highest sequence number received. The low 16-bits contain the highest sequence number received in an RTP data packet from source SSRC_n. The most significant 16-bits extend that sequence number with the corresponding count of sequence number cycles.

The reception report block 42 also includes a 32-bit field 48 for interarrival jitter. The jitter constitutes an estimated variance in the RTP packet interarrival times, as measured in timestamp units and expressed as an unsigned integer. A 32-bit field 49 is also allocated for the last SR timestamp (LSR). A 32-bit field 50 is also allocated for the delay time indicating the delay since the last SR (DLSR). The RTP paper more specifically describes the fields within the reception report block 42 and the uses of the fields.

The reception report block 42 of SR or RR provides the transmission of network performance data that allows gateways to determine the network packet delivery performance between session members. For example, when endpoint or a first gateway 20 (FIG. 1) receives a RR reception report message from a second gateway 23, the first gateway 20 can determine how well the second gateway 23 is receiving packets from gateway 20, or in other words how well gateway 23 "hears" gateway 20. For example, gateway 20 can compare the received packet count form gateway 23 with the number of packets expected or sent from the first gateway 20 as inferred from RTP sequence numbers, and thus determine the fractional packet loss from gateway 20 to gateway 23.

Similarly, when gateway 20 receives a SR packet from gateway 23, gateway 20 gets the same information as in an RR packet, and in addition receives information on how many RTP packets gateway 23 has sent to gateway 20. This data can be used to compute throughput of packets sent from gateway 23 to gateway 20. Note that a reception block 42 thus contains most of the network performance information relevant to the quality of the connection between the particular gateways.

Generally, the reception report 42 contains per-connection network performance information that is equally useful to either to the gateway that generates the reception report, as well as the gateway receiving the reception report block. That is, given two gateways, gateway 20 and gateway 23, then reception report blocks generated by gateway 20 describe how well gateway 20 "hears" gateway 23, and vice versa. Thus, any gateway can look at a reception report block and extract the useful information.

It should be noted, however, that there are certain network performance quantities that can only be computed by the gateway to which the reception block applies. For example, when gateway 23 receives a reception block from gateway 20, the reception report 42 also contains specific information that only gateway 23 can use. One particular example is the round trip delay parameter. In this case, gateway 23 puts a timestamp on its SRs. Gateway 20 maintains the delta time between its reception of the SR transmitted from gateway 23 and gateway 20's transmission of its next reception report back to gateway 23. Both the time stamp and delta times are included in gateway 20's reception report block transmitted in the RTCP message to gateway 23. In order to determine the round trip delay, gateway 23 receives the reception report block 42 from gateway 20, and gateway 23 subtracts these included times from its own reception time of the SR or RR in order to determine the round trip delay.

The point illustrated here is that the timestamp and delta times are useful to gateway 23 because these values must be compared with the timing of gateway 23's clock. Other quantities, such as packet loss and jitter observed at gateway 20 are useful to any system that has access to the reception block. In the quantities, such as packet loss and jitter observed at gateway 20 are useful to any system that has access to the reception block. In the following descriptions of reception block processing, it should be understood that the system that generates the reception block also computes round trip time, and that this information is made available along with the reception block to the monitor function.

Network Hierarchical Organization

Figure 4:
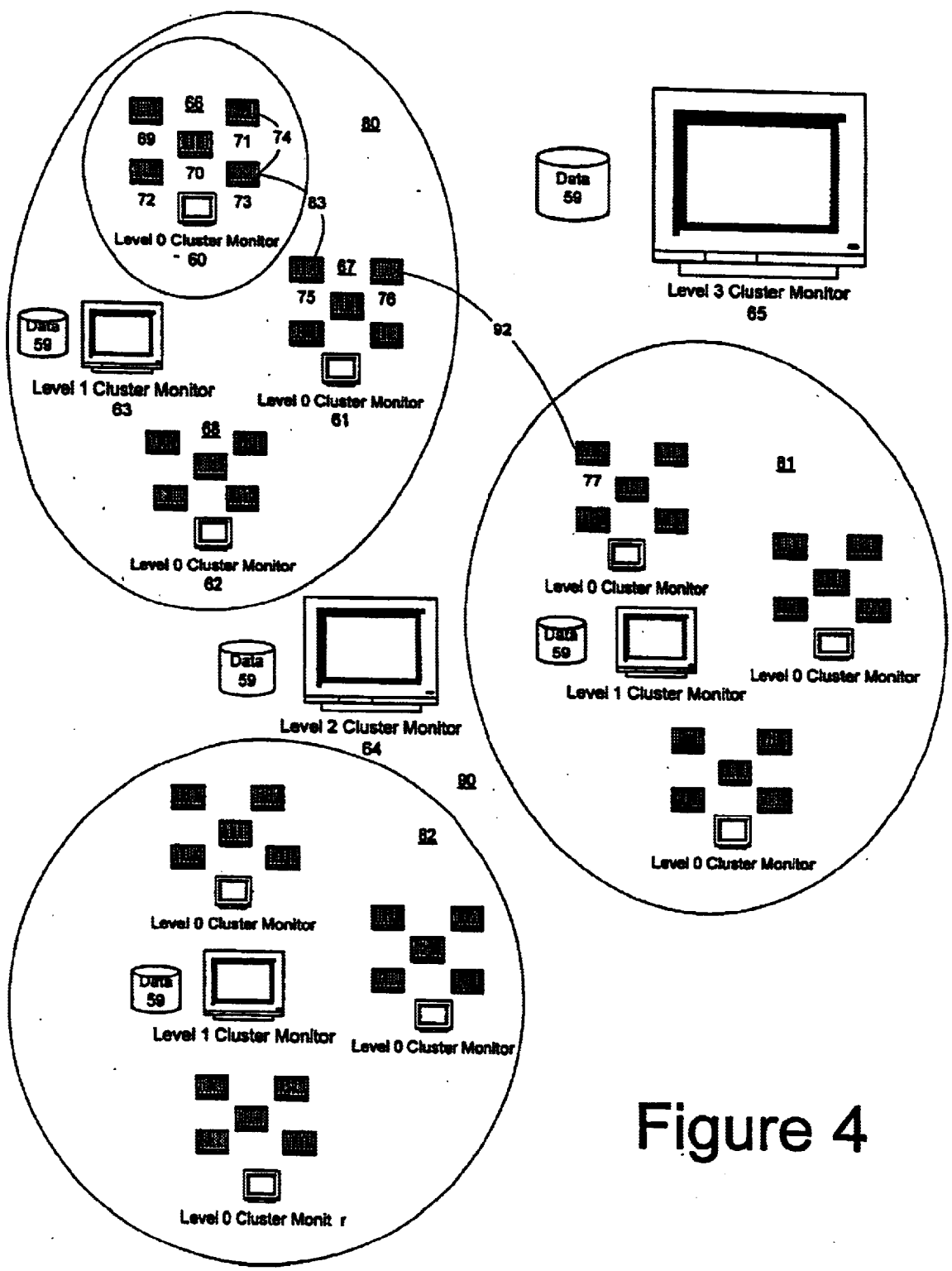
FIG. 4 shows simplified high-level diagram of a packet-based network system of FIG. 1 organized in a hierarchical architecture according to another aspect of the present invention.

Referring now to FIG. 4, the network performance monitoring system preferably includes a plurality of gateways which are designated as processing and network cluster monitoring sites 60–65 to collect network performance data and provide a network-wide view of conditions on the network 30. In this embodiment, the designated monitoring sites 60–65 collect network performance data such as that contained in the RTCP reception report block 42 (FIG. 3). Preferably, each of the network monitors 60–65 include a database 59 that collects and maintains network performance data. These designated network monitoring sites 60–65 are preferably organized in a topological network hierarchy such that the network monitor maintains network performance data of pairs of gateways according to the organization of the network hierarchy.

The network hierarchy uses a naming convention of "clusters" to refer to groupings of gateways and "levels" to define the placement of a gateway within the topological network hierarchy organization. The purpose of the network hierarchy organization is twofold. First, the network hierarchy distributes the network performance traffic associated with the monitoring function, as well as placing the processing burden on the network monitors 60–65 themselves. To enable monitoring of local network conditions, network performance data at the Level_0 cluster level must be made available at the global or higher network levels. Thus, the per-connection network performance information can be passed up the network hierarchy as facilitated by the organization of the network monitors 60–65. Related to this is the frequency or time scale at which network performance data is collected and analyzed. Data collection time scale and processing are described further below. The network hierarchy organization also allows for the topological localization of the network conditions to be monitored. In particular, problems can be traced to the relevant level of the network hierarchy, helping to isolate specific trouble spots.

At the lowest level of the network hierarchy, gateways 69, 70, 71, 72, 73 are grouped in units referred to in this embodiment as Level_0 clusters 66, 67, 68. Level_0 clusters are comprised of a set of gateways referred to as Level_0 members. In a Level_0 cluster 66 each gateway 69, 70, 71, 72, 73 may communicate network performance data with any other gateway 69, 70, 71, 72, 73 in the Level_0 cluster 66 such that the Level_0 cluster also defines every possible gateway pair that can be formed by its members. The term Level_0 cluster pair is used to define a gateway pair 74 for two gateways 71, 73 belonging to the same Level_0 cluster 66. In this model, the case of multiple, co-located gateways is considered a single, compound gateway. The network monitor 60 for given Level_0 cluster 60 is responsible for monitoring the network conditions between all Level_0 cluster pairs in its Level_0 cluster 60. The term Level_0 cluster monitor 60 is used to define this monitor.

The next higher level of the network hierarchy defines a unit called a Level_1 cluster 80, 81, 82. Each Level_1 cluster consists of a specific set of Level_0 clusters 66, 67, 68 called Level_1 cluster members. We define a Level 1 cluster pair 83 as a pair of gateways 73, 75 formed by any two gateways belonging to different Level_0 clusters 66, 67, within the Level_1 cluster 80. That is, each gateway in a Level_1 cluster pair 83 belongs to a different Level_0 cluster 66, 67 but each gateway's parent Level_0 cluster 66, 67 is a member of the Level_1 cluster 80. A Level_1 cluster 80 also has a distinct network monitor 63 for all Level_1 cluster pairs within the Level_1 cluster 80. The term Level_1 cluster monitor 63 is used to define this network monitor.

The next higher level of the hierarchy defines a unit called a Level_2 cluster. Each Level_2 cluster 90 consists of a specific set of Level_1 clusters 80, 81, 82, called Level_2 cluster members. We define a Level_2 cluster pair 92 as a pair of gateways formed by any two gateways 76, 77 belonging to different Level_1 clusters 80, 81 but each gateway's parent Level_1 cluster 80, 81 is a member of the same Level_2 cluster 90. A Level_2 cluster 90 has a distinct network monitor 80 for all Level_2 cluster pairs 92 within the Level_2 cluster. The term Level_2 cluster monitor 64 is used to define this monitor.

The hierarchy organization can continue to organize the entire network in this fashion, conceptually forever, to Level_n. FIG. 4 illustrates the hierarchy only up to the Level_2 cluster level. Note that regardless of the level of a given gateway pair, the statistics on the sessions terminated at the gateways that form the pair are still collected at each gateway. That is, the RTCP SR and RR messages are exchanged between the two gateways that form the pair. Also, it should be understood that no inherent restriction is placed on ability of any gateway to talk to any other gateway based upon this hierarchy.

Packet Transmission Interval

A feature of RTP that can be implemented in the preferred embodiment provides gateways with the ability to dynamically adjust the transmission interval between successive RTCP packets to prevent RR and SR messages from consuming or "flooding" the total bandwidth available for the gateway session members to communicate RTP data packets. In an exemplary embodiment, the session members employ an algorithm to dynamically adjust the interval between RR and SR messages from a given session member to maintain an upper bound of 5% on the fraction of the session bandwidth consumed by RTCP traffic.

As described in the RTP paper, the adjustment algorithm attempts to linearly scale the time interval or frequency according to the number of session members such that the fraction of session bandwidth dedicated to RTCP traffic is kept to a 5% constant or lower. The time interval adjustment algorithm also includes safeguards against RTCP packet flooding which can be precipitated by sudden changes in the number of session members, in the case, e.g., of a conference call. The actual interval or frequency of RTCP packets is the maximum of the computed upper limit and 5 seconds.

For a two-way voice call, a rough estimate of RTCP packet transmission interval can be obtained as calculated below. For the purposes of this illustration, it can be assumed that two 30 ms samples are transmitted in one RTP packet every 60 ms. To determine a lower limit on the RTCP packet interval (or upper limit on the RTCP packet frequency), assume a 100% bandwidth utilization, and apply the 5% limit. This yields one RTCP packet every 1.2 seconds, clearly below the 5-second limit. Because the calculated interval is below the 5% limit, the minimum 5-second interval would be applied. For bandwidth utilizations of 10% and 5%, the limit on RTCP traffic yields an RTCP packet every 12 and 24 seconds, above the 5-second limit. Therefore we expect the transmission interval for RTCP packets to have an approximate range of 5 to 30 seconds, for bandwidth utilization ranging between 100% (an extreme case) and 5%. This sets the timing resolution for the real-time monitoring of a single voice call carried via RTP. For a voice gateway terminating several calls from another gateway, the ensemble of multiple calls can provide even higher time resolution for the network path between the two gateways, assuming the RTCP transmission times for all the sessions are uncorrelated and largely not effected by one another.

Exemplary Network Monitoring Functions

The preferred embodiment of the network monitoring system provides a view of network conditions and performance at three different frequency resolutions or time scales: (1) real-time, for alarm conditions; (2) near real-time, for current conditions; and (3) daily, for long-term trend analysis. For example, real-time alarm conditions will be sent to the appropriate monitor as soon as possible after they are discovered. From the previous example used herein, the real-time alarm corresponds to a minimum response time scale on the order of about 10 seconds, assuming the problem is discovered during a single call. This alarm response time can be made shorter if the same problem is encountered by several concurrent calls between two gateways.

The time scale for near real-time monitoring should be set such that the fastest, typical trends may be temporally resolved. The long-term trend analysis can be based upon daily monitoring data may be used for capacity planning, or other adjustment of the network.

In the illustrative embodiment of the invention, a copy of every reception report 42 (FIG. 3) generated for inclusion in a SR or RR should be retained by the gateway for its network monitoring process. This can be accomplished in a variety of ways.

As part of the process of generating the reception report block 42, a copy of the reception report 42 could be "diverted" to a monitoring process on the gateway 20 to maintain the copy of the reception report 42. Typically, a reception report 42 is generated and sent to other peer systems during communication. In the present embodiment, the reception report is also maintained or diverted to other monitoring systems to maintain statistics for monitoring purposes.

The advantage of this method it is that is simple and allows accumulation of reception report blocks 42 independently of full SR or RR overhead at the monitoring device and it also does not require multicasting. Also, this approach could allow alarm conditions to be detected as part of the process of reception report block generation 42, even before the full SR or RR is created.

Alternatively, the full SR or RR could be generated and transmitted, with the originating gateway 20 being designated as an RTCP "third party monitor." This configuration is described in the RTP paper, and requires an implementation supporting multicasting. The advantage of this second method is that it standardizes the collection of reception blocks within the context of the RTCP third party monitor configuration. This could be important if interoperability becomes an issue. These two methods are illustrated in FIGS. 5 and 6.

Preferably, gateways maintain network performance data generated in reception reports in databases 14 (FIG. 1) organizing the data according to gateway pairs, the source gateway indicated in the reception block. For example, the combination of the source gateway indicated in the source field 45 (FIG. 3) of the reception report and the gateway on which the database 14 is being maintained defines a gateway pair. According to the network hierarchy previously described, the associated network monitor for the gateway pair is accordingly determined. Databases 14 are continuously updated to add the latest network performance statistics to any previous statistics for the gateway pairs. Periodically, the gateway database network performance information is transmitted to the appropriate network monitor associated with the gateway pair. A suggest period for transmitting updated database information is three minutes, the average length of a voice call. Preferably, statistics are maintained for the period such that at the end of each period, each updated quantity represents a time average over the period. After transmission of updated statistics, the statistics are reset in preparation for accumulation during the next period.

Exemplary Network Performance Processing

Figure 5:
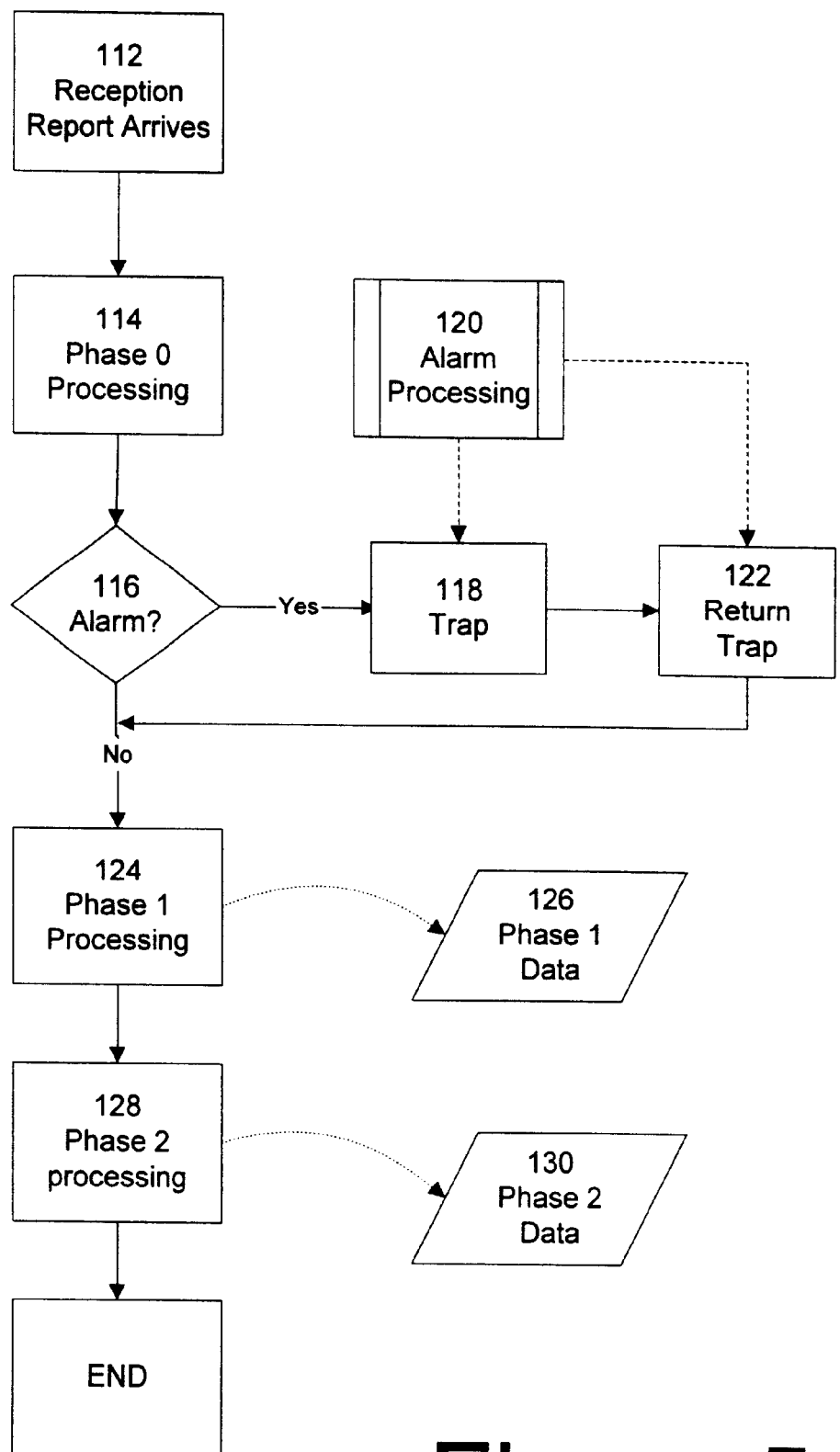
FIGS. 5 and 6 show flow charts of an illustrative method of processing network statistics of the network system of FIG. 1.
Figure 6:
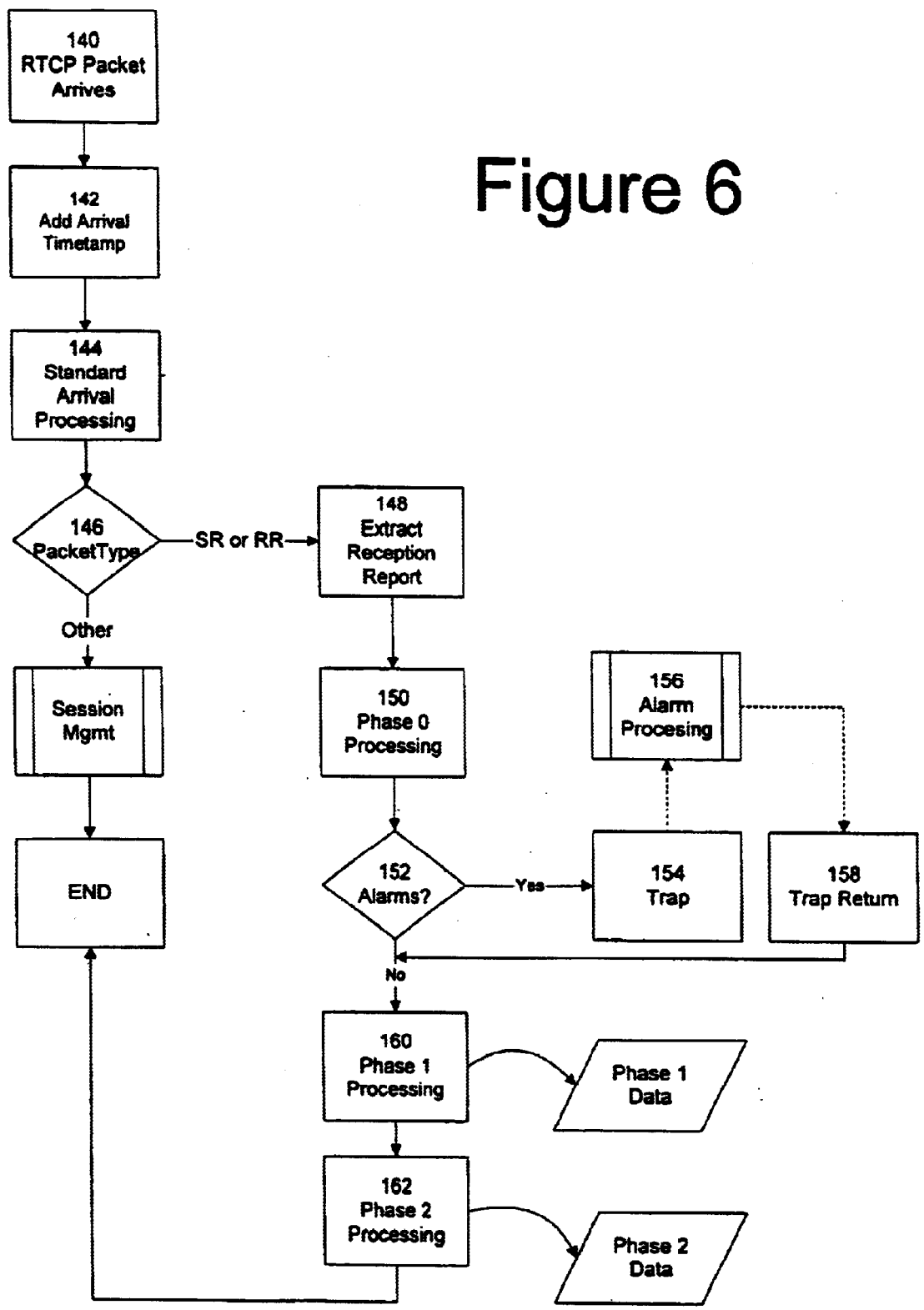

Shown in FIG. 5 is a flowchart describing a preferred high-level processing for the first method of processing network performance data according to different time scales. In this exemplary embodiment 3 different time scales are provided: real-time, near-real-time, and long-term analysis.

At step 112, when a RR or SR associated with a session on a gateway is generated, a copy of the reception block(s) 42 included in the RR or SR is made available to Phase 0 processing at step 114. Phase 0 processing provides the real-time processing to test network performance parameters such as packet delivery delay, packet loss, and jitter against alarm thresholds. During Phase 0 processing the network performance parameters are compared to determine if they exceed alarm thresholds. At step 116, exceeding the alarm condition causes the process to trap at step 118, and an external alarm processing routine to be invoked at step 120. Note that the alarm processing may be divided into more than one process, so that execution after the trap may resume before the actual alarm message is sent. E.g., event logging could be combined with the queuing of a message generation and transmission routine which runs at some later time; this second routine would include the algorithm to avoid flooding. The alarm 120 eventually results in a message being sent to the monitor for the associated gateway pair.

After execution resumes at step 124, Phase 1 processing performs the near real-time processing. At step 124, Phase 1 processing 124 updates the statistics for the source gateway at step 130 for which the reception block applies. Preferably, Phase 1 processing uses the Phase 0 network performance data such as packet delivery delay, packet loss, and jitter to maintain and update a Phase 1 database. The Phase 1 database organizes the measured network performance data according to gateway pairs. That is, network performance data are organized according to the source gateway in the reception report block. The combination of the specified source gateway and the gateway on which the database is maintained defines the gateway pair, and thus the associated monitor (level 0, level 1, etc.). The updating process includes adding the new reception report statistics to any previous statistics for this gateway pair. For the first four quantities, this is just an accumulation process. The appropriate way to record the current decoder information (if applicable) can be determined by those of skill in the art.

Finally at 128, Phase 2 processing performs the long-term monitoring function. Note that the gateway on which this process executes is the same gateway on which the SR or RR is generated. That is, even though a SR or RR is intended for transmission to an external gateway, the information in the reception report block refers to network conditions as observed at the originating gateway. Therefore, the originating gateway maintains a copy of the reception block and reports results to the appropriate network monitor.

At step 128, Phase 2 processing uses the Phase 0 data to maintain and update a long-term monitoring Phase 2 database. The Phase 2 database is an accumulation of the raw network performance data from each session over a long interval. The Phase 2 data may also include the statistics from each period of Phase 1 processing. Preferably, the interval of the Phase 2 database is suggested to be on the order of one day. At the end of the Phase 2 period, the database is transferred to the highest level network monitor for the system as shown in FIG. 4. At this site, the network monitor can track long-term network trends on a high network level or on a system-wide basis. Transfer of the Phase 2 data at the preferred daily rate may be performed by FTP during some relatively quiet time on the network such as the early morning hours.

Shown in FIG. 6 is a flowchart describing the high-level processing for the exemplary second method. In this approach, the entire RTCP packet is generated and in addition to being transmitted externally other gateways, is sent to an internal monitoring process on the generating gateway. If the generated RTCP packet is determined to be a SR or RR, its reception block is extracted, then processing of the reception report information proceeds as in the first method of FIG. 5. This process could also execute on an external, third-party monitor, as described in the RTP paper. Such a method might more easily accommodate interoperability of different vendors monitoring equipment. The inclusion of the full RTCP packet in this figure also allows for the possibility that other monitoring functions may be added later using other RTCP packet types. As with FIG. 5 above, it is assumed in this embodiment that the originating gateway processes the RTCP packet that an earlier process created for external transmission.

At step 140, a RTCP packet arrives and is received. At step 142, a time stamp indicating the arrival time of the RTCP packet is recorded. At step 144, the standard processing when a packet arrives is performed as described in the RTP paper and RTCP specification. At step 146, the packet type is determined looking to identify SR or RR packets. If a SR or RR packet is determined at step 146, the reception report block is extracted at step 148. Phase 0 processing similar to step 114 of FIG. 4 occurs at step 150.

At step 150, Phase 0 processing determines the following network performance parameters, including:

Round trip delay

Jitter

Packet Loss: fractional and cumulative

Receive buffer length

Current coder (if selectable coding implemented)

It should be understood that the described network performance parameters are exemplary, and other network performance parameters may be utilized.

At step 152, the level of the first four parameters, round trip delay, jitter, packet loss and receive buffer length is compared to threshold levels. The threshold levels can be determined as a matter of policy by the network operator. If any of the first four of these parameters exceed the specified threshold, then the software flow execution traps at step 154 to an external alarm processing routine at step 156. At step 156, the alarm processing routine is a separate process that logs the event and causes an alarm message to be sent to the monitor. An algorithm will be used to avoid flooding the network and the monitor with alarm messages. Once the alarm routine completes, execution of the RTCP Phase 1 and Phasic 2 processing at steps 160 and 162 resumes similar as described in FIG. 5 above.

The network performance parameters are obtained from the reception report block that was generated as part of the RTCP processing RTP. Receive buffer length is assumed to be a known system parameter (not necessarily the same value for each session).

Periodically the data associated with each gateway pair is transmitted to the network monitor associated with the session member gateway pair. A suggested update transmission period is three minutes, the average length of a voice call. The statistics are accumulated for the network performance parameters such that at the end of each update period, each updated quantity represents a time average over the period. After the update transmission period, the statistics are reset in preparation for accumulation during the next period.

The present embodiments provide a system for monitoring and management of network performance data to not only monitor the quality of individual voice calls but to evaluate the performance of the overall network. Network performance data on individual connections are maintained and organized in databases and maintained across the network according to a hierarchical scheme that allows the monitoring function to localize the network. Monitoring can be performed at various time scales to suit different types of monitoring.

The present embodiment preferably includes logic to implement the described methods in software modules as a set of computer executable software instructions. The Computer Processing Unit ("CPU") or microprocessor implements the logic that controls the operation of the channel card. The microprocessor executes software that can be programmed by those of skill in the art to provide the described functionality. The software can be represent as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods described in further detail below.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of the course, the embodiment may also be implemented with discrete hardware components and circuitry.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A hierarchical network of gateway devices in a packet-based network to facilitate the transmission and organization of network packet delivery performance data, the hierarchical network comprising:

a first group of networked gateway devices constituting a zero hierarchy level, wherein the first group of networked gateway devices transmit network packet delivery performance data to a first network monitor associated with the first group of networked gateway devices; and a second group of networked gateway devices constituting a first hierarchy level, the second group of networked gateway devices including a plurality of the first group of networked gateway devices, wherein the first network monitor for the first group of networked gateway devices transmits network packet delivery performance data to a second network monitor associated with the second group of networked gateway devices.

2. The network of claim 1 further comprising:

a third group of networked gateway devices constituting a second hierarchy level, the third group of networked gateway devices including a plurality of the second group of networked gateway devices; and a plurality of third network monitors, wherein each of the third network monitors receives network packet delivery performance data from at least one of the second group of networked gateway devices;

wherein the third network monitors each transmit network packet delivery performance data to a higher-level network monitor.

3. The network of claim 2 further comprising a plurality of higher-level network monitors, wherein the higher-level network monitors transmit network performance data to another even higher-level network monitor.

4. The network of claim 1 further comprising a plurality of first network monitors for a plurality of first group of networked gateway devices, wherein each of the first network monitors receives network performance data from gateway devices within its particular first group of networked gateway devices.

5. The network of claim 4 further comprising a plurality of second network monitors for a plurality of second group of networked gateway devices, wherein each of the second network monitors receives network performance data from a group of first network monitors.

* * * * *